United States Patent

Takata et al.

[11] Patent Number: 4,732,923
[45] Date of Patent: Mar. 22, 1988

[54] BUTADIENE POLYMER COMPOSITION

[75] Inventors: Takeshi Takata, Hyogo; Shinichi Yachigo, Osaka; Yukoh Takahashi, Osaka; Manji Sasaki, Osaka; Taisuke Okita, Osaka, all of Japan

[73] Assignee: Sumitomo Chemical Co., Ltd., Osaka, Japan

[21] Appl. No.: 886,104

[22] Filed: Jul. 16, 1986

[30] Foreign Application Priority Data

Jul. 16, 1985 [JP] Japan .................................. 60-157550

[51] Int. Cl.$^4$ ........................... C08K 5/09; C08K 5/15
[52] U.S. Cl. ..................................... 524/108; 524/291; 524/302; 525/303
[58] Field of Search ....................... 524/108, 291, 302; 525/303

[56] References Cited

U.S. PATENT DOCUMENTS

| | | | |
|---|---|---|---|
| 3,984,372 | 10/1976 | Cottman | 260/47 UA |
| 4,525,514 | 6/1985 | Yachigo et al. | 524/291 |
| 4,576,734 | 3/1986 | Ishii et al. | 524/108 |

FOREIGN PATENT DOCUMENTS

| | | |
|---|---|---|
| 0079806 | 5/1983 | European Pat. Off. ............ 524/291 |
| 47-4167 | 2/1972 | Japan . |
| 58-84835 | 5/1983 | Japan . |
| 59-71341 | 4/1984 | Japan . |
| 58-144733 | 8/1984 | Japan . |

Primary Examiner—Joseph L. Schofer
Assistant Examiner—Peter D. Mulcahy

[57] ABSTRACT

A butadiene polymer composition having incorporated the following stabilizers therein:

A phenolic compound (I) of the formula:

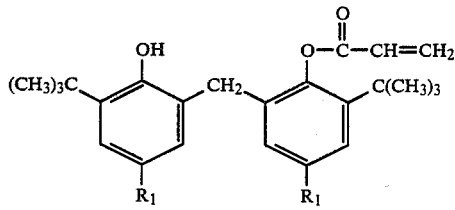

wherein $R_1$ represents a $C_1$–$C_4$ alkyl group, and a sulfur-containing compound (II) represented by the general formula,

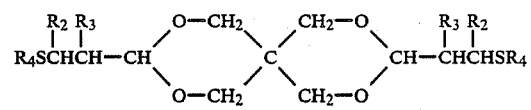

wherein $R_2$ and $R_3$ independently represent a hydrogen atom or a $C_1$–$C_6$ alkyl group, and $R_4$ represents a $C_3$–$C_{18}$ alkyl group, wherein the weight ratio of (I) to (II) is 1 to 0.5–10. The butadiene polymer composition of the present invention is quite effective to prevent gel formation caused by heat, especially in the absence of oxygen.

4 Claims, No Drawings

BUTADIENE POLYMER COMPOSITION

The present invention relates to a butadiene polymer composition superior in thermal resistance.

Butadiene polymers such as solution-polymerized polybutadiene rubber (BR), solution-polymerized styrene-butadiene copolymeric rubber (SBR), styrene-butadiene block copolymers (SBS), etc, etc. are generally produced by anionic polymerization in a hydrocarbon solvent using a Ziegler catalyst or organo-lithium compound as catalyst. But, these butadiene polymers have a defect that they are inferior in thermal resistance. For example, SBS generates fish-eye gel because of its shortage in thermal resistance oxing to higher processing temperatures and rates required for the film extrusion step, and because of this, there occur problems such as marked reduction in the physical properties of the film, etc.

Also, in the conventional production of BR, SBR, etc., the steam stripping method is employed to remove the polymerization solvent from the polymerization solution after completion of polymerization. In recent years, however, the solvent-direct-drying method which can control the quantity of steam used to a minimum in theory, has been proposed in terms of energy saving. In this method, however, the reaction solution after polymerization is generally treated at a temperature above 150° C., which is considerably higher than the boiling point of the polymerization solvent, and this causes new problems such as gel formation during the treatment, etc. Thus, an improvement in the thermal resistance of butadiene polymers, particularly, in the absence of oxygen is desired.

It is hitherto well known that, in order to stabilize such butadiene polymers, various kinds of phenolic, phosphorus-containing and sulfur-containing antioxidants are added in the course of production and processing of the polymers. For example, there are well known the following methods: A method of using phenolic antioxidant alone such as 2,6-di-tert-butyl-4-methylphenol, 2,2'-methylenebis(4-methyl-6-tert-butylphenol), n-octadecyl 3-(3,5-di-tert-butyl-4-hydroxyphenyl)propionate, triethylene glycol bis[3-(3-tert-butyl-5-methyl-4-hydroxyphenyl)propionate], pentaerythritol tetrakis [3-(3,5-di-tert-butyl-4-hydroxyphenyl)propionate], 1,3,5-trimethyl-2,4,6-tris(3,5-di-tert-butyl-4-hydroxybenzyl)benzene, etc.; and a method of using the above phenolic antioxidant in combination with phosphoruscontaining antioxidant such as tris(-nonylphenyl)phosphite, distearyl pentaerythritol diphosphite, etc. or sulfur-containing antioxidant such as dilauryl thiodipropionate, dimyristyl thiodipropionate, distearyl thiodipropionate, pentaerythritol tetrakis(3-laurylthiopropionate), etc.

These methods have an effect to prevent gel formation caused by oxidative degradation in the coexistence of oxygen, but have no quite satisfactory effect to prevent gel formation caused by heat in the absence of oxygen.

In the situation like this, the present inventors studied to develop stable butadiene polymers which form no gels, particularly, in the absence of oxygen, and as a result, found that butadiene polymer composition which is very stable to gel formation by heat in the absence of oxygen is obtained by selectively combining a phenolic compound having a particular structure with a sulfur-containing compound having a particular structure and incorporating a particular amount of the resulting mixture in the butadiene polymer. The present inventors thus attained to the present invention.

The present invention provides a butadiene polymer composition characterized in that a phenolic compound (I) represented by the general formula (I),

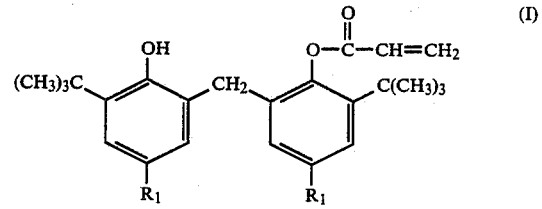

wherein $R_1$ represents a $C_1$–$C_4$ alkyl group, and a sulfur-containing compound (II) represented by the general formula (II),

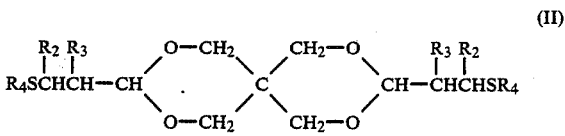

wherein $R_2$ and $R_3$ independently represent a hydrogen atom or a $C_1$–$C_6$ alkyl group, and $R_4$ represents a $C_3$–$C_{18}$ alkyl group, are incorporated in butadiene polymer, the weight ratio of (I) to (II) being 1 to 0.5–10.

In the phenolic compound represented by the foregoing general formula (I), a substituent $R_1$ is preferably a methyl or ethyl group, particularly preferably a methyl group in terms of performances as a thermal degradation inhibitor.

Such the phenolic compound can be produced by reacting 2,2'-methylenebis(6-tert-butyl-4-alkylphenol) represented by the general formula (III),

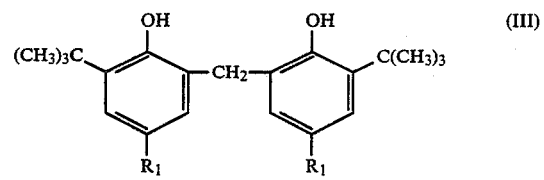

wherein $R_1$ represents a $C_1$–$C_4$ alkyl group, with acrylic acid or its lower alkyl ester or acid chloride by the well-known method.

Representative examples of such the phenolic compound are shown in Table 1.

TABLE

| Abbreviation | $R_1$ |
|---|---|
| I-1 | —$CH_3$ |
| I-2 | —$CH_2CH_3$ |

TABLE-continued

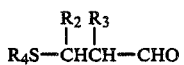

| Abbreviation | R₁ |
|---|---|
| I-3 | $-CHCH_2CH_3$ with $CH_3$ branch |
| I-4 | $-C(CH_3)_3$ |

In the sulfur-containing compound represented by the foregoing general formula (II), substituents $R_2$ and $R_3$ are preferably a hydrogen atom or a $C_1-C_3$ alkyl group in terms of thermal and oxidation stability, and a substituent $R_4$ is preferably a $C_{12}-C_{18}$ alkyl group for the same reason.

Representative examples of such the sulfur-containing compound are shown in Table 2.

TABLE 2

$$R_4SCHCH-CH\begin{matrix}O-CH_2\\ \\O-CH_2\end{matrix}C\begin{matrix}CH_2-O\\ \\CH_2-O\end{matrix}CH-CHCHSR_4$$

with $R_2, R_3$ substituents

| Compound No. | $R_2$ | $R_3$ | $R_4$ |
|---|---|---|---|
| II-1 | $-CH_3$ | $-H$ | $-C_8H_{17}$ |
| II-2 | $-C_4H_9$ | $-H$ | $-C_{12}H_{25}$ |
| II-3 | $-CH_3$ | $-H$ | $-C_{12}H_{25}$ |
| II-4 | $-H$ | $-H$ | $-C_{12}H_{25}$ |
| II-5 | $-CH_3$ | $-H$ | $-C_{18}H_{37}$ |
| II-6 | $-H$ | $-CH_3$ | $-C_{18}H_{37}$ |

Such the sulfur-containing compound can be produced by reacting pentaerythritol with an aldehyde represented by the general formula, $$R_4S-CHCH-CHO$$

with $R_2, R_3$ substituents wherein $R_2$, $R_3$ and $R_4$ have the same meanings as described above, according to the common acetalization.

In the present invention, the amount of the phenolic compound (I) and sulfur-containing compound (II) incorporated in butadiene polymers is 0.1 to 3 parts by weight, preferably 0.2 to 2 parts by weight, as a total of the compounds (I) and (II), based on 100 parts by weight of butadiene polymer.

The proportion of the both compounds used is 1 to 0.5–10, preferably 1 to 1–5 as expressed in the weight ratio of the phenolic compound (I) to the sulfur-containing compound (II).

For incorporating the phenolic compound (I) and sulfur-containing compound (II) in butadiene polymer, the commonly employed methods, for example, a method of adding the compounds to polymerization solutions after completion of anionic polymerization, a method of directly adding the compounds to extrusion-granulation or molding steps, etc., can be applied.

The butadiene polymer composition of the present invention is produced by incorporating the foregoing phenolic compound (I) and sulfur-containing compound (II), the both being a stabilizer, in butadiene polymer. This composition, however, may contain other additives as need arises, and such additives include for example ultraviolet absorbers, light stabilizers, antioxidants, metal inactivators, metal soaps, nucleating agents, lubricants, antistatic agents, flame retardants, pigments, fillers, etc.

Particularly, the weather resistance of the composition can be improved by incorporating ultraviolet absorbers, hindered amine light stabilizers, etc. such as 2-hydroxy-4-methoxybenzophenone, 2-hydroxy-4-n-octoxybenzophenone, 2-(2-hydroxy-5-methylphenyl)-benzotriazole, 2-(2-hydroxy-3-tert-butyl-5-methylphenyl)-5-chlorobenzotriazole, 2-(2-hydroxy-3,5-di-tert-butylphenyl)-5-chlorobenzotriazole, 2-(2-hydroxy-3,5-di-amylphenyl)benzotriazole, 2,4-di-tert-butylphenyl 3′,5′-di-tert-butyl-4′-hydroxybenzoate, [2,2′-thiobis(4-tert-octylphenolate)]butylamine Ni salt, 2,2,6,6-tetramethyl-4-piperidinyl benzoate, bis(2,2,6,6-tetramethyl-4-piperidinyl) sebacate, bis(1,2,2,6,6-pentamethyl-4-piperidyl) 2-[3,5-di-tert-butyl-4-hydroxybenzyl)-2-n-butylmalonate, 1-[2-{3-(3,5-di-tert-butyl-4-hydroxyphenyl)propionyloxy}ethyl]-4-[3-(3,5-di-tert-butyl-4-hydroxyphenyl)propionyloxy]-2,2,6,6-tetramethylpiperidine, dimethyl succinate, 1-(2-hydroxyethyl)-4-hydroxy-2,2,6,6-tetramethylpiperidine polycondensation products, poly{[6-(1,1,3,3-tetramethylbutyl)amino-1,3,5-triazine-2,4-diyl][(2,2,6,6-tetramethyl)-4-piperidyl)imino]hexamethylene[(2,2,6,6-tetramethyl-4-piperidyl)imino]}, poly{[6-morpholino-1,3,5-triazine-2,4-diyl][(2,2,6,6-tetramethyl-4-piperidyl)imino]hexamethylene[(2,2,6,6-tetramethyl-4-piperidyl)imino]}, etc.

Also, the color of the composition can be improved by incorporating phosphite antioxidants such as distearyl pentaerythritol diphosphite, tris(2,4-di-tert-butylphenyl)phosphite, tris(2-tert-butyl-4-methylphenyl)phosphite, bis(2,4-di-tert-butylphenyl)pentaerythritol diphosphite, tetrakis(2,4-di-tert-butylphenyl)-4,4′-biphenylene diphosphite, etc.

Butadiene polymers used in the present invention include solution-polymerized polybutadiene rubber (BR), solution-polymerized styrene-butadiene copolymeric rubber (SBR), styrene-butadiene block copolymers (SBS), impact-resistant polystyrene modified with BR, SBR or SBS (HI-PS), acrylonitrile-butadiene-styrene copolymers (ABS), etc. These butadiene polymers may be used alone or in mixture with other polymers.

The present invention will be illustrated with reference to the following reference examples and examples, but it is not limited to these examples.

REFERENCE EXAMPLE 1

Synthesis of the compound I-1

To a 200-ml four-necked flask equipped with a thermometer, a stirrer, a condenser and a dropping funnel were added 17.03 g (0.05 mole) of 2,2′-methylenebis(6-tert-butyl-4-methylphenol), 3.60 g (0.05 mole) of acrylic acid, 11.13 g (0.11 mole) of triethylamine and 70 g of toluene, and after replacing the air in the flask by nitrogen, 12.27 g (0.08 mole) of phosphorus oxychloride was added dropwise over 20 minutes with stirring. After completion of the addition, stirring was continued at room temperature for 1 hour. After completion of the reaction, the organic layer was washed with water, and toluene in the organic layer was removed by distillation under reduced pressure. The residue obtained was recrystallized from n-hexane to obtain 16.77 g of the desired compound having a melting point of 133° to 134° C. as white crystals (yield, 85%).

REFERENCE EXAMPLE 2

Synthesis of the compound II-4

To a 100-ml flask equipped with a drain pipe were added 2.58 g (0.01 mole) of 2-dodecylthiopropionaldehyde, 0.68 g (0.005 mole) of pentaerythritol, 0.095 g (0.0005 mole) of p-toluenesulfonic acid monohydrate and 50 ml of toluene, and the mixture was refluxed for 8 hours at a temperature of 110° C. while removing water. After completion of the reaction, the reaction mixture was cooled, neutralized with sodium methylate, washed with eight 200-ml portions of water and separated into an aqueous and oily layers. The oily layer was concentrated by distillation, and the residue obtained was washed with isopropanol to obtain 2.5 g of the desired compound having a melting point of 64° to 65° C. as white crystals.

EXAMPLE 1

In a nitrogen gas atmosphere, 0.08 part by weight of n-butyl lithium was added to a cyclohexane solution containing 15 parts by weight of 1,3-butadiene. After polymerization was carried out for 1 hour at a temperature of 70° C., 20 parts by weight of styrene, 15 parts by weight of 1,3-butadiene and 50 parts by weight of styrene were added in this order, and polymerization was carried out for 1 hour at a temperature of 70° C. for each addition of the compounds. After completion of the polymerizations, required amounts of the test compounds shown in Table 1 were added, and cyclohexane was removed by heating in a nitrogen gas atmosphere to obtain a block copolymer of B-A-B-A structure having a butadiene content of 30 wt.%.

Using the block copolymer obtained, thread-like extruding test was carried out on a lab-plastomill extruder under the condition described below, and the gel content of the thread-like extruded product obtained was measured as a toluene-insoluble matter. The result is shown in Table 1.

The gel content was measured as follows: About 1 g of the thread-like test sample was accurately weighed and dipped in 200 ml of toluene; after stirring for 24 hours, the solution was filtered through a 200-mesh wire net, and the insoluble matter was dried and weighed; and the gel content was calculated from the weight ratio of the insoluble matter to the test sample.

Test condition:

| (1) Tester proper | Lab-plastomill Type 40-100 (Toyo Seiki Co.) |
|---|---|
| (2) Extruder | Type D 20-25 (Toyo Seiki Co.) |
| (3) Measurement condition | |
| Strand die diameter | 1 mm φ |
| Cylinder temperature | 230–260° C. |
| Number of rotations | 8 r.p.m. |
| Falling distance | 93 cm |

EXAMPLE 2

In a nitrogen gas atmosphere, 1,3-butadiene was polymerized at a temperature of from 60° to 65° C. in n-hexane with n-butyl lithium as catalyst. After completion of the polymerization, required amounts of the test compounds shown in Table 2 were added, and n-hexane was removed by heating in a nitrogen gas atmosphere to obtain polybutadiene rubber (BR).

Using the polybutadiene rubber obtained, a kneading test was carried out in a nitrogen gas stream on a lab-plastomill (Type 40-100, a product of Toyo Seiki Co.), and a gelation preventing effect at the time of kneading was evaluated by torque behavior accompanying gelation. The result is shown in Table 2.

The gelation preventing effect is expressed by a time required for the torque to reach a peak (gelation time), and a longer gelation time means a higher gelation preventing effect.

Test condition on lab-plastomill:

| (1) Mixer | Type R-60 |
|---|---|
| (2) Range of measurable torque | 0–500 kg · cm |
| (3) Amount fed | 30 g |
| (4) N₂ flow rate | 1 liter/min. |
| (5) Test temperature | 180° C. |
| (6) Number of rotations | 10 r.p.m. for 3 minutes for pre-heating; 60 r.p.m. after pre-heating. |

The symbols of test compound in Tables 1 and 2 express the following compounds.

AO-1: n-Octadecyl 3-(3,5-di-tert-butyl-4-hydroxyphenyl)propionate
AO-2: 2,6-Di-tert-butyl-4-methylphenol
AO-3: Pentaerythritol tetrakis(3-laurylthiopropionate)
AO-4: Dimyristyl thiodipropionate

TABLE 1

Amounts (PHR) and test results

| Test Compound | Present example | | | | | | | Comparative example | | | | | | | | | | | | | |
|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 |
| Phenolic compound | | | | | | | | | | | | | | | | | | | | | no addition |
| I-1 | 0.2 | 0.2 | 0.2 | | 0.2 | | | | | | | | | 0.2 | 0.2 | | | | | | |
| I-2 | | | | 0.2 | 0.2 | | 0.2 | | | | | | | | | 0.2 | | | | | |
| AO-1 | | | | | | | | 0.2 | | | | | | | | | 0.2 | | 0.2 | | |
| AO-2 | | | | | | | | | 0.2 | | | | | | | | | 0.2 | | 0.2 | |
| Sulfur containing compound | | | | | | | | | | | | | | | | | | | | | |
| II-4 | 0.4 | 0.8 | | 0.4 | | | | | | 0.2 | | | | | | | 0.4 | 0.4 | | | |
| II-5 | | | 0.4 | | 0.4 | | | | | | 0.2 | | | | | | | | 0.4 | 0.4 | |
| AO-3 | | | | | | | | | | | | 0.2 | | 0.4 | | 0.4 | | | | | |
| AO-4 | | | | | | | | | | | | | 0.2 | | 0.4 | | | | | | |
| Gel content (wt. %) | 0.0 | 0.0 | 0.0 | 0.1 | 0.1 | 0.7 | 1.0 | 15 | 8 | 35 | 37 | 36 | 40 | 0.4 | 0.6 | 0.6 | 11 | 5 | 10 | 4 | 80 |

TABLE 2

| Test compound | Amounts (PHR) and test results | | | | | | | | | | | | | | | | | | | | |
|---|---|---|---|---|---|---|---|---|---|---|---|---|---|---|---|---|---|---|---|---|---|
| | Present example | | | | | Comparative example | | | | | | | | | | | | | | | |
| | No. | | | | | | | | | | | | | | | | | | | | |
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Phenolic compound | | | | | | | | | | | | | | | | | | | | | No addition |
| I-1 | 0.2 | 0.2 | 0.2 | | | 0.2 | | | | | | | | 0.2 | 0.2 | | | | | | |
| I-2 | | | | 0.2 | 0.2 | | 0.2 | | | | | | | | | 0.2 | | | | | |
| AO-1 | | | | | | | | 0.2 | | | | | | | | | | | 0.2 | 0.2 | |
| AO-2 | | | | | | | | | 0.2 | | | | | | | | | 0.2 | | 0.2 | |
| Sulfur containing compound | | | | | | | | | | | | | | | | | | | | | |
| II-4 | 0.4 | 0.8 | | 0.4 | | | | | | 0.2 | | | | | | | 0.4 | 0.4 | | | |
| II-5 | | | 0.4 | | 0.4 | | | | | | 0.2 | | | | | | | | 0.4 | 0.4 | |
| AO-3 | | | | | | | | | | | | 0.2 | | 0.4 | | 0.4 | | | | | |
| AO-4 | | | | | | | | | | | | | 0.2 | | 0.4 | | | | | | |
| Gelation time (minute) | 35 | 38 | 34 | 31 | 30 | 19 | 16 | 4 | 7 | 3 | 3 | 3 | 3 | 24 | 21 | 21 | 6 | 9 | 6 | 10 | 2 |

What is claimed is:

1. A butadiene polymer composition characterized in that a phenolic compound (I) represented by the general formula,

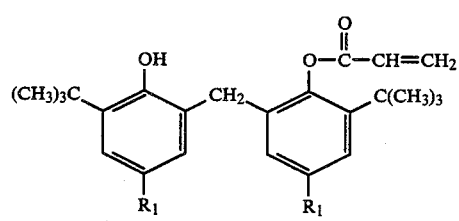

wherein $R_1$ represents a $C_1$–$C_4$ alkyl group, and a sulfur-containing compound (II) represented by the general formula,

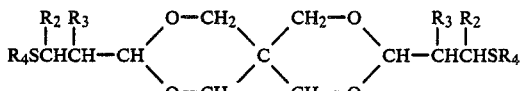

wherein $R_2$ and $R_3$ independently represent a hydrogen atom or a $C_1$–$C_6$ alkyl group, and $R_4$ represents a $C_3$–$C_{18}$ alkyl group, are incorporated in butadiene polymer, the weight ratio of (I) to (II) being 1 to 0.5–10.

2. A butadiene polymer composition as claimed in claim 1 wherein each of $R_2$ and $R_3$ is a hydrogen atom or a $C_1$–$C_3$ alkyl group and $R_4$ is a $C_{12}$–$C_{18}$ alkyl group.

3. A butadiene polymer composition as claimed in claim 1 wherein the total amount of the compounds (I) and (II) is 0.1 to 3 parts by weight based on 100 parts by weight of the butadiene polymer.

4. A butadiene polymer composition as claimed in claim 1 wherein the butadiene polymer is selected from solution-polymerized polybutadiene rubber (BR), solution-polymerized styrene-butadiene copolymeric rubber (SBR), styrene-butadiene block copolymer (SBS), impact-resistant polystyrene modified with BR, SBR or SBS (HI-PS) and acrylonitrile-butadiene-styrene copolymer (ABS).

* * * * *